United States Patent [19]  
Buroff

[11] Patent Number: 4,573,696  
[45] Date of Patent: Mar. 4, 1986

[54] SELF-PROPELLED RECREATIONAL VEHICLE

[76] Inventor: Arthur N. Buroff, 1500 St. Georges Ave., Rahway, N.J. 07065

[21] Appl. No.: 594,279

[22] Filed: Mar. 28, 1984

[51] Int. Cl.⁴ .................. B62M 1/04; B62M 1/14
[52] U.S. Cl. ................ 280/247; 280/250; 280/252
[58] Field of Search ............ 280/247, 242 R, 249, 280/250, 252, 261, 259, 211, 293; 180/6.2; D21/71; 188/74

[56] References Cited

U.S. PATENT DOCUMENTS

| | | | |
|---|---|---|---|
| 215,861 | 11/1969 | Cook | D21/71 |
| 1,455,404 | 5/1923 | Mulveny | 280/252 |
| 1,610,101 | 12/1926 | Lind et al. | 280/256 |
| 3,052,480 | 9/1962 | Malmquist | 280/250 |
| 3,086,785 | 4/1963 | Pacuk | 280/1.196 |
| 3,096,100 | 7/1963 | Clarke | 280/261 |
| 3,250,347 | 5/1966 | Holloway | 188/74 |
| 3,386,753 | 6/1968 | Quedreux | 280/211 |
| 3,427,037 | 2/1969 | Marasco | 280/1.189 |
| 3,734,535 | 5/1973 | Sidlauskas | 280/215 |
| 3,753,577 | 8/1973 | Robinson | 280/261 |
| 3,870,333 | 3/1975 | Burdick | 188/74 |
| 3,888,511 | 6/1975 | Parrilla | 280/239 |
| 4,066,273 | 1/1978 | Lohr | 280/249 |
| 4,099,737 | 7/1978 | Waugh | 280/261 |
| 4,272,095 | 6/1981 | Ptaszek | 280/282 |
| 4,274,651 | 6/1981 | Dumont | 280/250 |
| 4,484,646 | 11/1984 | Smith | 280/211 |

Primary Examiner—John A. Pekar  
Assistant Examiner—Everett G. Diederiks, Jr.  
Attorney, Agent, or Firm—Martha G. Pugh

[57] ABSTRACT

A self-propelled vehicle, primarily for children, comprising rigid frame having elongated seat and leg rest, and backrest integrally formed with and making an internal angle with the seat rest which may be slightly greater than 90 degrees. Beneath the seat adjacent apex of the angle, the frame is mounted on supporting means journalled on an axle which connects a pair of enlarged drive wheels. In normal operating position, the leg rest is supported above the ground by a first caster-like wheel. A similar second caster-like wheel is mounted to an externally projecting support near upper end of the backrest, which in normal operating position is held off the ground. The vehicle is propelled forward in a linear direction by operating the drive wheels either by a system of foot pedals or hand cranks. In another modification, in which the position of the seat is lowered, the drive wheels are rotated manually by knobs near the periphery. When the rider applies pressure against the upper portion of backrest, the entire frame, including seat and backrest, rotates backwards through a small arc centered on the axle, causing the first caster-like wheel to be lifted off of the ground, and second caster-like wheel to contact and rest on the ground, so that rider is resting on his back, and legs supported by the front end of the vehicle in slightly raised position, in which position he can still cause the vehicle to move forward in linear fashion.

7 Claims, 6 Drawing Figures

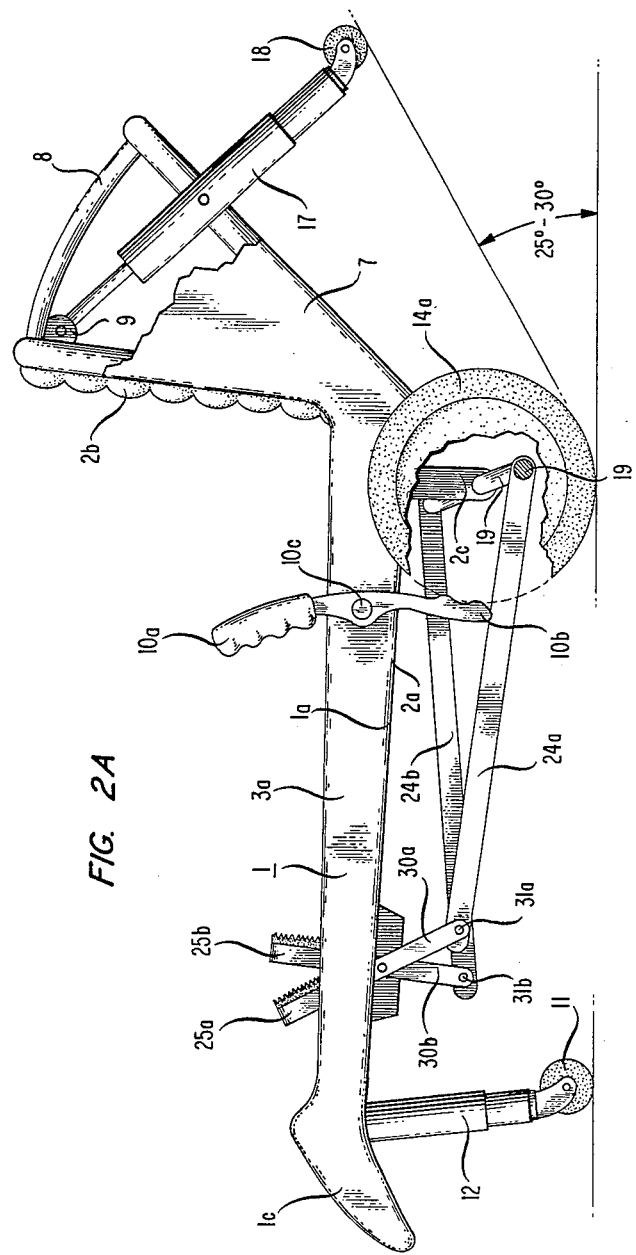

SELF-PROPELLED RECREATIONAL VEHICLE

BACKGROUND OF THE INVENTION

This invention relates in general to rider-propelled recreational vehicles and more particularly, to recreational vehicles, primarily for children.

The prior art is replete with various types of velocipedes, two, three and four-wheeled devices, and hobby horses for children, the main function of which is to amuse the child and develop muscular coordination. In addition to the usual to and fro movements, a number of these devices disclose the possibility of rotational movement of the vehicle frame or body about the front or rear axle. A prime consideration in the use of such toys is the comfort and safety of the child.

SHORT DESCRIPTION OF THE INVENTION

Accordingly, the principal object of the present invention is to provide an improved recreational vehicle for children, more particularly one in which the operator has greater control over the vehicle, and thereby, enhanced operational safety compared to prior art recreational children's vehicles.

Another object of the invention, in one of its aspects, is to develop greater muscular coordination in the user's body, particularly of the upper body, chest and arms.

These and other objects are realized in a preferred embodiment of the vehicle of the present invention comprising a pair of large main drive wheels connected by an axle, on which is journaled supporting means on which is mounted a body frame for supporting the rider's body. The body frame comprises an elongated seat portion which extends out in a direction substantially normal to the axis to provide a leg rest. The seat portion is formed integrally with a backrest, so that the surface upon which the body rests forms an angle somewhat greater than 90 degrees, say, about 110 degrees, with the seat portion.

In a first or normal position, the leg rest is supported by a single spring-biased, substantially centered, front leg on which is mounted a first, small caster-type wheel. Another leg having a second small caster-type wheel, which in normal operation position is held off the ground, is attached in rigid outwardly-protruding relation near the upper portion at the rear of the backrest. This second caster-type wheel is disposed, in normal operating position of the vehicle, to be tangential to a plane forming an angle of, say, 25 or 30 degrees with the horizontal ground surface supporting the vehicle. Thus, when the body frame is rotated in a clockwise direction about the axle, the support is shifted from the first small caster wheel, in which the leg rest is held parallel to the ground, to a second upended position in which the backrest is held parallel to the ground, so that the operator, in this position, has his back parallel to the ground, and his legs and feet raised at a slight angle above the ground.

Several different arrangements are provided for propelling the vehicle in a forward linear path. In one embodiment in which the frame has been lowered relative to the main drive wheels, the latter are manually rotated by the rider lying in the vehicle, by means of knobs attached near the perimeter of the drive wheels. In another embodiment, the drive wheels are rotated by the rider utilizing a hand crank and pulley system. In still another embodiment, the drive wheels are rotated by the rider utilizing foot pedals which are mechanically coupled to the axle crank through a pair of power transfer arms.

A hand brake is pivoted on the side of the frame so that force can be applied in tangential relation to one or both of the main drive wheels.

A principal advantage of Applicant's system over prior art systems is that the rider operating the device has control over the vehicle whether it is in the first or normal position, or has been rotated to the second upended position. This greatly contributes to the safety with which the device can be operated, as does the strategically placed hand brake.

Another advantage of the hand-operated embodiments of the present invention is that they facilitate muscular development of the upper body, chest and arms of the operator, and may have a positive therapeutic value in the treatment of patients afflicted with lower body paralysis.

Another advantage of this device is that in the preferred embodiment the operator, who may be a child, has his legs extended for operating pedals to propel the device. The low center of gravity and easy accessibility to the hand brake increase the safety of this device for the operator. Moreover, in the upended position, the angle at which the operator's legs and feet are extended relative to the ground is small, so as not to interfere with the operator's line of sight.

These and other objects, features, and advantages will be better understood from a detailed description of the invention with reference to the attached drawings.

SHORT DESCRIPTION OF THE DRAWINGS

FIG. 1 is an overall perspective view of one embodiment of the self-propelled recreational vehicle of the present invention in which the vehicle is propelled forward by foot pedals.

FIGS. 2A and 2B respectively, show a side elevation and a rear elevation of the foot pedal-operated embodiment of FIG. 1.

FIGS. 3A and 3B, respectively, show, in side elevation, and rear cross-section, a modified form of the present invention in which the seat and backrest portion of the frame are lowered relative to the drive wheels, to accommodate the reach of an operator in manually propelling the vehicle forward by means of knobs on the drive wheels.

FIG. 4 shows another modification of the invention in which the vehicle is propelled forward by a pair of hand cranks.

DETAILED DESCRIPTION OF THE INVENTION

Figure 1:
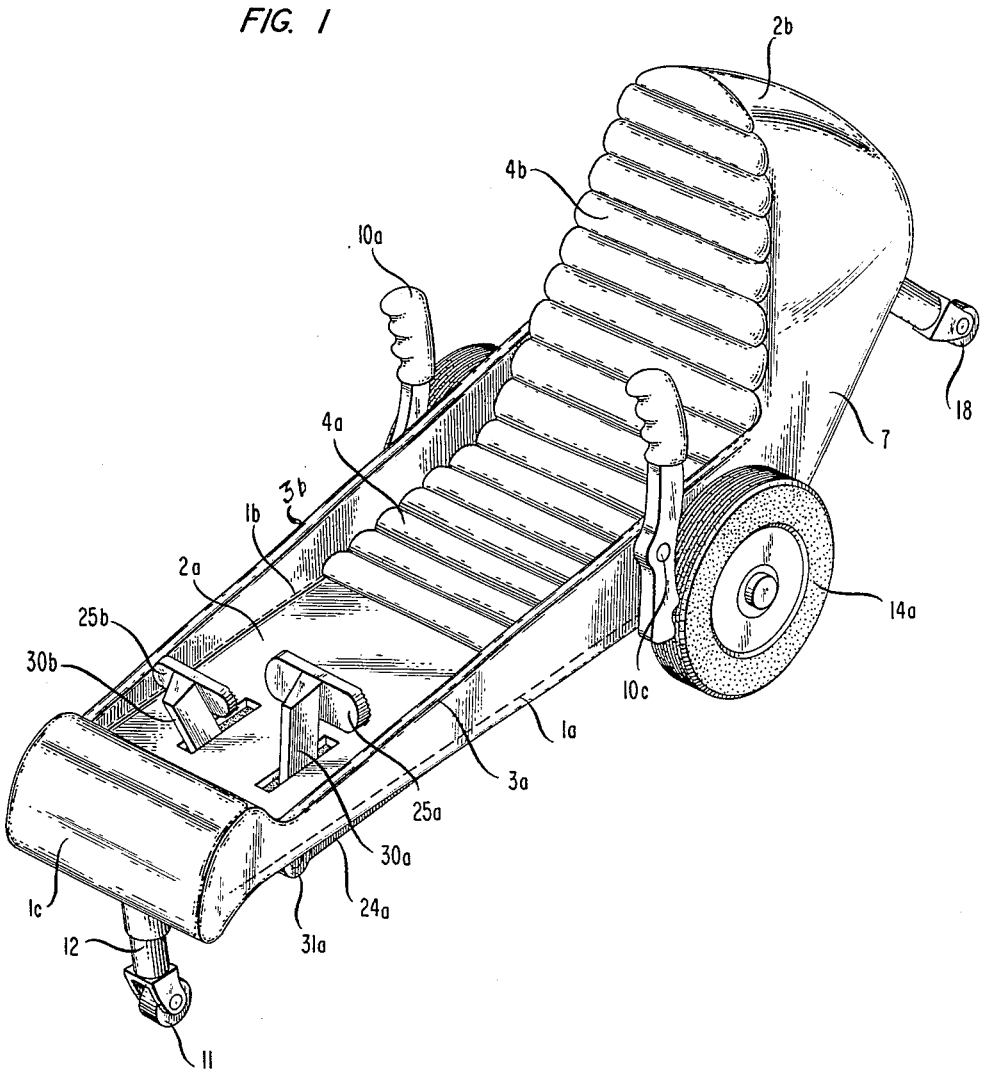
Figure 2B:
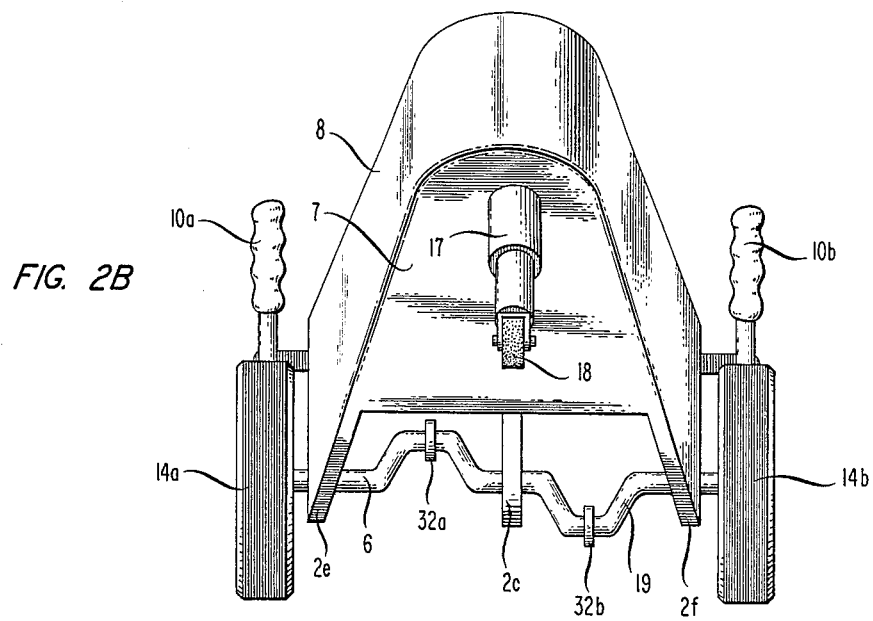

Let us refer to the perspective showing of one embodiment of the invention indicated in FIG. 1, and to the side and rear elevational showings of an embodiment of similar type indicated in FIGS. 2A and 2B.

A rigid frame 1 comprises a pair of rods or rails, 1a, 1b (not shown), say, 3 feet long, and spaced-apart, say, 18 inches, of aluminum, or other strong, rigid material which are connected together at the end by a metal or plastic end panel 1c comprising a flat sheet. The frame 1 serves as a mounting for a thin sheet of aluminum or other thin rigid material 2a, which functions to support the rider in sitting position. The rear portions of the rods or rails 1a and 1b and the base 2a are bent upward through an angle which, in the vertical plane, exceeds 90 degrees, and in the present embodiment is, say, 100 degrees, to form a backrest 2b which extends to a vertical height of, say, about 2½ feet above the base surface of 2a. The backrest 2b is integrally formed with the seat rest 2a. The integral combination is supported along the junction, or slightly rounded apex of the angle between them, by a central supporting post comprising bearing member 2c, and left and right lateral supporting posts comprising bearing members 2e and 2f which respectively ride on the straight portions of the axle crank 19. A seat pad 4a, back pad 4b may comprise, for example, a leather or plastic covering over a resilient material, such as foam rubber, or it may be integrally molded with the seat and backrest portions 2a and 2b, so as to completely cover the same. If desired, a pair of hand rails or alternatively, vertical side walls 3a, 3b may be mounted parallel to and above the supporting rods 1a, 1b to provide handholds affording greater safety to the rider.

Axle crank 19 is mounted for rotation in bearing members 2c, 2e and 2f. The axle crank 19 terminates at its two ends in a pair of identical rubber-tired drive wheels 14a and 14b (FIG. 2B) which are spaced-apart, say, 18 inches, and which have overall diameters of say, 24 inches.

The foot rest comprising base 2a is supported parallel to the ground in normal operating position by means of a hollow post comprising a spring-biased shock absorber 12, the sleeve of which is secured to the base member 2a in a centered position about, say, 6 inches in from the foot end. The plunger of the spring shock absorber 12 terminates at its lower end in a conventional caster wheel 11, which in the presently described embodiment may have a diameter of, say, 2 inches.

Forming an integral angle with the rear surface of the backrest 2b is a projecting rear panel 7 which may comprise a sheet of metal, such as aluminum or plastic. This is fastened along its lower edge in rigid relation to backrest 2b and the backrest supporting members 2c, 2e and 2f. One or more transverse struts 8 which may comprise, for example, an aluminum rod, connect the upper ends of backrest 2b and projecting panel 7. Thus, the entire assemblage, including the seat rest 2a, backrest 2b and rear panel 7 form a rigidly connected unit which, when pressure is exerted on the upper end of backrest 2b, is rotated backwards about the axle 19, in a manner to be described.

A second caster wheel 18, similar to caster wheel 11, is fastened to the plunger of spring-biased shock absorber 17 which projects outwardly in normal relation to panel 7, the sleeve being secured near the upper edge of panel 7. Spring-biased shock absorbing post 17 is similar to shock absorbing post 12, the sleeve of 17 passing through and being rigidly fastened to panel 7, and the upper end of the sleeve being secured to the rear of backrest 2b by pin 9. The length of spring-biased, shock absorber-plunger assembly is such that in the first, normally-operated position, the caster wheel 18 is tangent, at its outer extremity, to a plane making an angle of between 25 and 30 degrees with the horizontal supporting surface of the vehicle. The reason for this is that it is important, for safety reasons, that when operating in the second, upended position, the operator's legs are not raised up to a position in which his vision is impeded.

The embodiment shown in FIGS. 1, 2A and 2B is propelled forward by means of a pair of foot pedals 25a and 25b. The latter are supported by a pair of vertically-disposed rigid members 30a and 30b, respectively, which are hingedly connected through the pivots 31a, 31b to power transfer arms 24a and 24b, the two of which are connected through the connecting rods 32a and 32b (See FIG. 2B) to oppositely-phased bends of the crank shaft 19.

The hand brake handle 10a which is pivoted at 10c manipulates the brake shoe 10b to compress the same tangentially against the tire of wheel 14a for stopping the vehicle. A similar brake may be applied to the opposite wheel 14b.

Figure 3B:
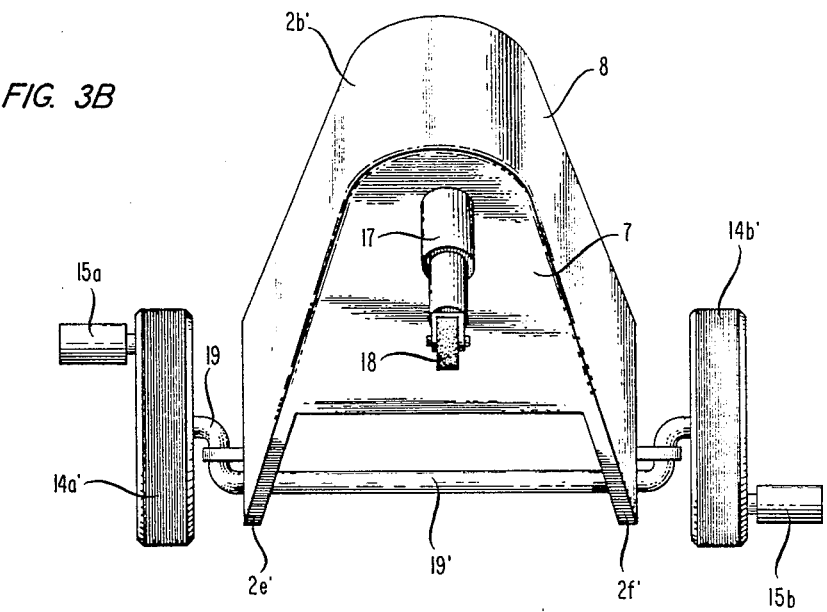
Figure 3A:
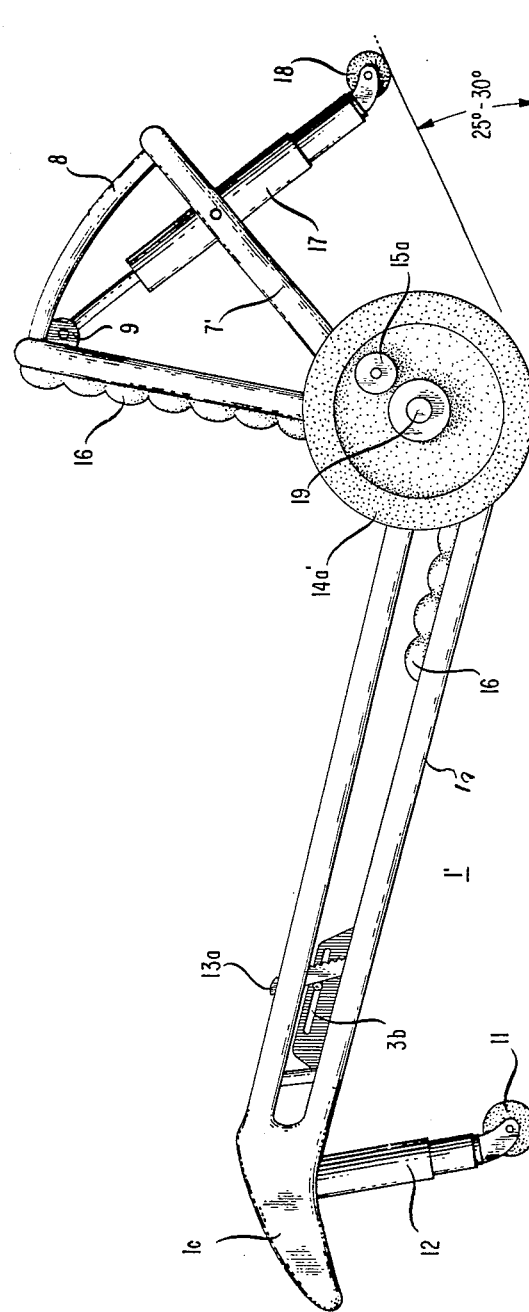

A modified form of the device is shown in FIGS. 3A and 3B in which similar designating numbers indicate parts which are substantially as shown and described with reference to FIGS. 1, 2A and 2B. In the embodiment of FIG. 3, foot pedals 25a, 25b are replaced by adjustable foot rests 13a, 13b and a hand-controlled propelling system, in which the rider merely pushes one of the knobs 15a and 15b (not shown) which are spaced in a radial direction from the axle 19 near the outer periphery of each of drive wheels 14a' and 14b'.

An important difference between the embodiment disclosed in FIGS. 1, 2A, 2B and 4, and that disclosed in FIGS. 3A, 3B is the position of the frame in the latter, the leg and seat portion 2a' and 2b' having been lowered in relation to the position of the wheels 14a', 14b'. This may be more clearly understood by reference to FIGS. 3A and 3B of the drawings. Referring to FIG. 3B, which is a section through the plane indicated by the arrows 3B—3B of FIG. 3A, the axle 19' is substantially U-shaped, open at the top, with the upper ends terminating in outwardly-flanged ends on each of which is mounted a respective one of the wheels 14a' and 14b'. The lower end of back 2b' is supported at its opposite sides by the downwardly-extended members 2e' and 2f' which provide bearings for rotation of the axle 19'. The purpose of lowering the seating portion of the frame 1 so that the leg rest 2a and the backrest 2b are joined along a line substantially below the axial positions about which 14a' and 14b' rotate, is to enable the operator to comfortably reach the knobs 15a and 15b in order to manually propel the vehicle forward.

Figure 4:
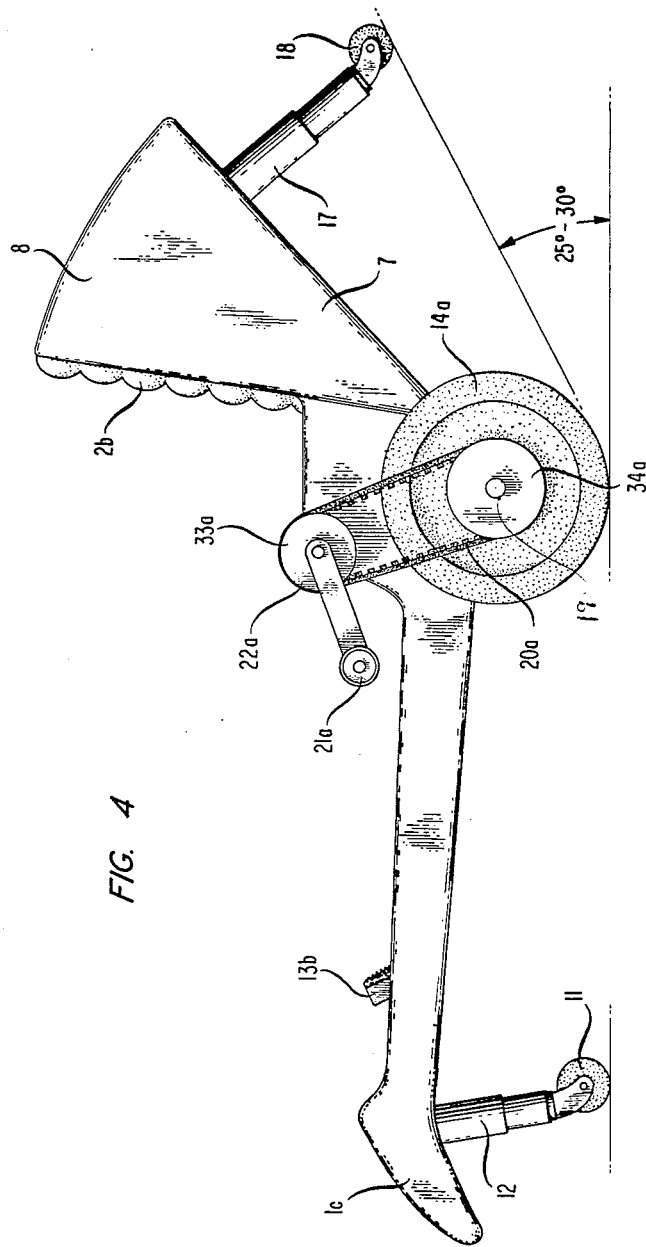

Another modification of this invention is shown in FIG. 4 in which the hand crank is replaced by a hand-operated crank-pully system. In the latter position of the frame 1, including seat and backrests 2a and 2b, the axle 19 and wheels 14a, 14b are the same as shown in FIGS. 1, 2A and 2B. In this embodiment, the drive wheel 14a, and its counterpart 14b, are each driven by a pair of pulleys 33a, 34a, and 33b, 34b (not shown) coupled to opposite drive wheels 14a and 14b, around which pulleys a pair of endless toothed pulleys chains 20a, 20b (not shown) move.

OPERATION

In a first or normally operating position, the rider is seated on the supporting seat 2a with his legs extended, and his back leaning against the backrest 2b.

In the embodiment of FIGS. 1, 2A and 2B, he propels the vehicle forward in a linear motion by alternately pushing foot pedals 25a and 25b. In the embodiment of FIGS. 3A, 3B, the rider sits much lower, and the vehicle is propelled forward or back when he pushes manually against the knobs 15a and 15b. In the embodiment of FIG. 4, the device is propelled forward or back by manipulating the hand cranks 21a and 21b. When the rider exerts sufficient force against the backrest 2b, the entire frame of the vehicle, including the seat and backrest is rotated in a clockwise direction through an angle of, say 25 to 30 degrees about the axle 19, to an upended position, so that the caster wheel 12 is lifted off of the ground, and the caster wheel 18 contacts and rests on the ground, permitting the vehicle to move forward while the rider is resting on his back, with his legs and feet raised at an angle above his body.

Although the invention has been described with reference to the specific embodiment shown in the drawings, it will be understood that the invention is only limited by the scope of the appended claims.

What is claimed is:

1. A self-propelled vehicle comprising in combination a substantially rigid frame in the form of a seat portion having an elongated leg rest, and a backrest secured to said seat portion and forming therewith in a vertical plane an internal angle between about 90 and 120 degrees;

an axle having a pair of drive wheels rotatably mounted at opposite ends of said axle;

means for supporting said frame on said axle at the rear of said seat portion in a position adjacent the junction between said leg rest and said backrest comprising at least one supporting member projecting from said frame, and including bearing means journaled on said axle;

in normal operating position, means for supporting the leg rest above the ground comprising a supporting post projecting downwardly in a substantially vertical direction from said leg rest and terminating in a first auxiliary wheel substantially smaller than said drive wheels, said first auxiliary wheel resting on the ground in said normal operating position;

a second supporting post substantially centered on and projecting outwardly and downwardly from the upper rear surface of said backrest, said second supporting post terminating at its outer end in a second auxiliary wheel similar in size to said first auxiliary wheel, said second auxiliary wheel being maintained above the ground in said normal operating position; and means for simultaneously rotating said drive wheels for propelling said vehicle in a forward linear direction;

whereby when said entire frame including said seat portion and said backrest is rotated rearward through a small angle not exceeding about 30 degrees to an upended position, said first auxiliary wheel is lifted off of the ground and said backrest is supported substantially parallel to the ground on said second auxiliary wheel and the rotation of said drive wheels continues to propel said vehicle in a forward linear direction.

2. The combination in accordance with claim 1 wherein said first and second posts include shock absorbing means.

3. The combination in accordance with claim 1 wherein a hand brake is pivotally connected to said frame and constructed in response to manual pressure against the handle to bear tangentially against the periphery of at least said one drive wheel.

4. The combination in accordance with claim 1 whereby said means for simultaneously rotating said two drive wheels and propelling said vehicle in a forward linear direction comprises a pair of foot pedals and mechanical linkages comprising drive arms for linking each of said foot pedals to a crank mechanism for rotating said axle.

5. The combination in accordance with claim 1 wherein said means for rotating said drive wheels comprises a knob fixed to the outer periphery of at least one said drive wheels, and said axle is substantially U-shaped, open at the top and having its upper ends bent outwardly for supporting one of said drive wheels on each of its ends, whereby the junction between said leg rest and said backrest is supported on the lower portion of said axle at a plane substantially below the plane formed by the axes of rotation of said wheels.

6. The combination in accordance with claim 1 wherein said means for rotating said drive wheels comprises at least one hand crank mechanically linked to crank means for rotating said axle.

7. The combination in accordance with claim 1 wherein the internal angle between said seat portion and said backrest in a plane normal to the principal plane of said seat portion is between 90 and 120 degrees, and wherein in normal operating position the outer periphery of said second auxiliary wheel is tangential to a plane forming an angle of between 25 and 30 degrees with the plane of the ground supporting said vehicle.

* * * * *